(12) United States Patent
Cekola et al.

(10) Patent No.: US 11,731,594 B2
(45) Date of Patent: Aug. 22, 2023

(54) DRIVER AND DIAGNOSTIC SYSTEM FOR A BRAKE CONTROLLER

(71) Applicant: HORIZON GLOBAL AMERICAS INC., Plymouth, MI (US)

(72) Inventors: Nicholas Albert Cekola, Plymouth, MI (US); Dennis Michael Morse, Plymouth, MI (US); Marvin Hoot, Plymouth, MI (US); Yilong Chen, Plymouth, MI (US); Srikanth Kadudula, Plymouth, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 59 days.

(21) Appl. No.: 17/186,626

(22) Filed: Feb. 26, 2021

(65) Prior Publication Data
US 2021/0179038 A1    Jun. 17, 2021

Related U.S. Application Data

(63) Continuation of application No. 15/707,267, filed on Sep. 18, 2017, now Pat. No. 10,946,841.
(Continued)

(51) Int. Cl.
*B60T 17/22* (2006.01)
*B60T 7/20* (2006.01)
(Continued)

(52) U.S. Cl.
CPC ............. *B60T 7/20* (2013.01); *B60T 8/172* (2013.01); *B60T 8/1708* (2013.01); *B60T 8/323* (2013.01);
(Continued)

(58) Field of Classification Search
CPC .......... B60T 7/20; B60T 8/1708; B60T 8/172; B60T 8/323; B60T 8/885; B60T 17/22; B60T 2230/06; B60T 2270/404
See application file for complete search history.

(56) References Cited

U.S. PATENT DOCUMENTS

| 1,132,294 A | 3/1915 | Wilkie |
| 2,228,631 A | 1/1941 | Kuiper |

(Continued)

FOREIGN PATENT DOCUMENTS

| CA | 2157820 | 3/1996 |
| EP | 0334412 | 9/1989 |

(Continued)

OTHER PUBLICATIONS

Motorola, Motorola Holster-SYN0718, http://commerce.motorola.com/cgi-bin/ncommerce3/ProductDisplay?prrfnbr=230044&prmenbr=126&accessories_cgrfnbr=22.
(Continued)

*Primary Examiner* — Thomas W Irvin
(74) *Attorney, Agent, or Firm* — McDonald Hopkins LLC

(57) ABSTRACT

A brake control unit includes a processor, a first high side driver and a second high side driver. The processor sends signals to the first high side driver and the second high side driver. The first and second high side drivers process the signals independent of each other. The processor diagnoses faults and locations of faults based on feedback from the high side drivers. The first high side driver controls the braking of a first trailer brake. The second high side driver controls the braking of a second trailer brake.

5 Claims, 6 Drawing Sheets

Related U.S. Application Data

(60) Provisional application No. 62/395,439, filed on Sep. 16, 2016, provisional application No. 62/395,444, filed on Sep. 16, 2016.

(51) Int. Cl.
  *B60T 8/17* (2006.01)
  *B60T 8/172* (2006.01)
  *B60T 8/32* (2006.01)
  *B60T 8/88* (2006.01)

(52) U.S. Cl.
  CPC .............. *B60T 8/885* (2013.01); *B60T 17/22* (2013.01); *B60T 2230/06* (2013.01); *B60T 2270/404* (2013.01)

(56) References Cited

U.S. PATENT DOCUMENTS

| | | |
|---|---|---|
| 2,870,276 A | 1/1959 | Gelzer |
| 3,015,958 A | 1/1962 | Dove |
| 3,023,626 A | 3/1962 | Bonnell |
| 3,053,348 A | 9/1962 | Stair |
| D199,904 S | 12/1964 | Nunn, Jr. |
| 3,183,512 A | 5/1965 | Castle |
| 3,276,270 A | 10/1966 | Speen |
| 3,354,725 A | 11/1967 | Canfield |
| D215,158 S | 9/1969 | Ozaki |
| 3,497,266 A | 2/1970 | Umpleby |
| 3,501,599 A | 3/1970 | Horecky |
| 3,503,652 A | 3/1970 | Broek |
| 3,519,805 A | 7/1970 | Throne-Booth |
| 3,569,788 A | 3/1971 | Niblack |
| 3,574,414 A | 4/1971 | Jacob |
| 3,598,453 A | 8/1971 | Riordan |
| 3,601,794 A | 8/1971 | Blomenkamp et al. |
| 3,704,670 A | 12/1972 | Dobson et al. |
| 3,710,629 A | 1/1973 | Wojtulewicz |
| 3,730,287 A | 5/1973 | Fletcher et al. |
| 3,738,710 A | 6/1973 | Pokrinchak et al. |
| 3,778,118 A | 12/1973 | Podlewski et al. |
| 3,780,832 A | 12/1973 | Marshall |
| 3,792,250 A | 2/1974 | Kilbourn et al. |
| 3,833,784 A | 9/1974 | Bobel et al. |
| 3,867,844 A | 2/1975 | Shimizu et al. |
| 3,897,979 A | 8/1975 | Vangalis et al. |
| 3,908,782 A | 9/1975 | Lang et al. |
| 3,909,075 A | 9/1975 | Pittet, Jr. et al. |
| 3,953,080 A | 4/1976 | Bremer |
| 3,953,084 A | 4/1976 | Pittet, Jr. et al. |
| 3,955,652 A | 5/1976 | Nilsson et al. |
| 3,964,796 A | 6/1976 | Bremer |
| 3,967,863 A | 7/1976 | Tomecek et al. |
| 3,981,542 A | 9/1976 | Abrams et al. |
| 3,981,544 A | 9/1976 | Tomecek et al. |
| 3,993,362 A | 11/1976 | Kamins et al. |
| 4,030,756 A | 6/1977 | Eden |
| 4,042,810 A | 8/1977 | Mosher |
| 4,043,608 A | 8/1977 | Bourg et al. |
| 4,050,550 A | 9/1977 | Grossner et al. |
| 4,061,407 A | 12/1977 | Snow |
| 4,072,381 A | 2/1978 | Burkhart et al. |
| 4,076,327 A | 2/1978 | Hubbard |
| 4,079,804 A | 3/1978 | Paillard |
| 4,084,859 A | 4/1978 | Bull et al. |
| 4,108,006 A | 8/1978 | Walter |
| 4,122,434 A | 10/1978 | Jensen |
| 4,128,745 A | 12/1978 | Marsilio et al. |
| 4,161,649 A | 7/1979 | Klos et al. |
| 4,196,936 A | 4/1980 | Snyder |
| 4,232,910 A | 11/1980 | Snyder |
| D257,972 S | 1/1981 | Freehauf et al. |
| D257,973 S | 1/1981 | Reid |
| 4,277,895 A | 7/1981 | Wiklund |
| 4,295,687 A | 10/1981 | Becker et al. |
| 4,316,067 A | 2/1982 | Whiteman, Jr. |
| 4,336,592 A | 6/1982 | Beck |
| D266,501 S | 10/1982 | Stefanik |
| 4,386,427 A | 5/1983 | Hosaka |
| 4,398,252 A | 8/1983 | Frait |
| 4,402,047 A | 8/1983 | Newton et al. |
| 4,404,619 A | 9/1983 | Ferguson |
| 4,414,848 A | 11/1983 | Shutt |
| 4,419,654 A | 12/1983 | Funk |
| 4,445,376 A | 5/1984 | Merhav |
| D275,973 S | 10/1984 | Marino |
| 4,550,372 A | 10/1985 | Kahrs |
| 4,586,138 A | 4/1986 | Mullenhoff et al. |
| 4,587,655 A | 5/1986 | Hirao et al. |
| 4,624,506 A | 11/1986 | Doto |
| 4,660,418 A | 4/1987 | Greenwood et al. |
| 4,665,490 A | 5/1987 | Masaki et al. |
| 4,681,991 A | 7/1987 | Anderson |
| 4,721,344 A | 1/1988 | Frait et al. |
| 4,722,576 A | 2/1988 | Matsuda |
| 4,726,627 A | 2/1988 | Frait et al. |
| 4,768,840 A | 9/1988 | Sullivan et al. |
| 4,836,616 A | 6/1989 | Roper et al. |
| 4,845,464 A | 7/1989 | Drori et al. |
| 4,849,655 A | 7/1989 | Bennett |
| 4,850,656 A | 7/1989 | Ise et al. |
| 4,852,950 A | 8/1989 | Murakami |
| 4,856,850 A | 8/1989 | Aichele et al. |
| 4,872,099 A | 10/1989 | Kelley et al. |
| 4,905,518 A | 3/1990 | Kubler |
| 4,928,084 A | 5/1990 | Reiser |
| D308,666 S | 6/1990 | Oesterheld et al. |
| D315,216 S | 3/1991 | Kelley et al. |
| 5,002,343 A | 3/1991 | Brearley et al. |
| D316,399 S | 4/1991 | Wharton |
| 5,016,898 A | 5/1991 | Works et al. |
| 5,032,821 A | 7/1991 | Domanico et al. |
| D319,423 S | 8/1991 | Karczewski et al. |
| 5,044,697 A | 9/1991 | Longyear et al. |
| 5,050,937 A | 9/1991 | Eccleston |
| 5,050,938 A | 9/1991 | Brearley et al. |
| 5,050,940 A | 9/1991 | Bedford et al. |
| 5,058,960 A | 10/1991 | Eccleston et al. |
| D322,426 S | 12/1991 | Austin |
| D323,136 S | 1/1992 | Chase et al. |
| 5,080,445 A | 1/1992 | Brearley et al. |
| D326,926 S | 6/1992 | Stephenson et al. |
| 5,139,315 A | 8/1992 | Walenty et al. |
| 5,142,473 A | 8/1992 | Davis |
| 5,149,176 A | 9/1992 | Eccleston |
| D331,226 S | 11/1992 | Austin |
| D334,733 S | 4/1993 | Morgan et al. |
| 5,226,700 A | 7/1993 | Dyer |
| 5,242,215 A | 9/1993 | Krause |
| 5,255,962 A | 10/1993 | Neuhaus et al. |
| 5,322,255 A | 6/1994 | Garrett |
| 5,333,948 A | 8/1994 | Austin et al. |
| D351,141 S | 10/1994 | Van Akkeren et al. |
| 5,352,028 A | 10/1994 | Eccleston |
| 5,355,717 A | 10/1994 | Tanaka et al. |
| 5,389,823 A | 2/1995 | Hopkins et al. |
| D365,298 S | 3/1995 | Austin |
| 5,398,901 A | 3/1995 | Brodmann et al. |
| 5,423,601 A | 6/1995 | Sigi |
| 5,446,657 A | 8/1995 | Ikeda et al. |
| D362,659 S | 9/1995 | Hedding et al. |
| D363,999 S | 11/1995 | Taylor et al. |
| 5,487,305 A | 1/1996 | Ristic et al. |
| 5,487,598 A | 1/1996 | Rivard et al. |
| 5,498,910 A | 3/1996 | Hopkins et al. |
| D369,224 S | 4/1996 | Karlo et al. |
| 5,510,989 A | 4/1996 | Zabler et al. |
| D370,448 S | 6/1996 | McCoy et al. |
| 5,549,364 A | 8/1996 | Mayr-Frohlich et al. |
| 5,571,023 A | 11/1996 | Anthony |
| 5,575,543 A | 11/1996 | Pheonix |
| D376,437 S | 12/1996 | Karlo et al. |
| D376,576 S | 12/1996 | Pratt |
| 5,581,034 A | 12/1996 | Dao et al. |

(56) References Cited

U.S. PATENT DOCUMENTS

| | | |
|---|---|---|
| 5,587,865 A | 12/1996 | Bielig et al. |
| 5,606,308 A | 2/1997 | Pinkowski |
| D378,511 S | 3/1997 | Austin |
| 5,615,930 A | 4/1997 | McGrath et al. |
| 5,620,236 A | 4/1997 | McGrath et al. |
| 5,648,755 A | 7/1997 | Yagihashi |
| 5,649,749 A | 7/1997 | Kullmann et al. |
| D388,523 S | 12/1997 | Austin |
| 5,700,068 A | 12/1997 | Austin |
| 5,706,909 A | 1/1998 | Bevins et al. |
| 5,719,333 A | 2/1998 | Hosoi et al. |
| D392,604 S | 3/1998 | Wright et al. |
| 5,738,363 A | 4/1998 | Larkin |
| 5,741,048 A | 4/1998 | Eccleston |
| D394,626 S | 5/1998 | Sacco et al. |
| 5,782,542 A | 7/1998 | McGrath et al. |
| 5,785,393 A | 7/1998 | McGrath et al. |
| 5,800,025 A | 9/1998 | McGrath et al. |
| D399,187 S | 10/1998 | Kay |
| 5,832,840 A | 11/1998 | Woof |
| D404,365 S | 1/1999 | Robertson et al. |
| 5,890,084 A | 3/1999 | Halasz et al. |
| D407,694 S | 4/1999 | Hill et al. |
| D408,773 S | 4/1999 | Blanchard |
| 5,893,575 A | 4/1999 | Larkin |
| D411,829 S | 7/1999 | Pancheri et al. |
| 5,949,147 A | 9/1999 | McGrath et al. |
| 5,951,122 A | 9/1999 | Murphy |
| D418,098 S | 12/1999 | Wallace |
| D418,822 S | 1/2000 | Worley et al. |
| 6,012,780 A | 1/2000 | Duvernay |
| 6,039,410 A | 3/2000 | Robertson et al. |
| 6,052,644 A | 4/2000 | Murakami et al. |
| 6,068,352 A | 5/2000 | Kulkarni et al. |
| 6,100,943 A | 8/2000 | Koide et al. |
| 6,122,568 A | 9/2000 | Madau et al. |
| 6,126,246 A | 10/2000 | Decker, Sr. et al. |
| 6,131,457 A | 10/2000 | Sato |
| D433,387 S | 11/2000 | Roth et al. |
| D434,011 S | 11/2000 | Roth et al. |
| D434,391 S | 11/2000 | Roth et al. |
| D434,392 S | 11/2000 | Reichard |
| D435,494 S | 12/2000 | Reichard |
| 6,158,822 A | 12/2000 | Shirai |
| D436,932 S | 1/2001 | Roth et al. |
| 6,175,108 B1 | 1/2001 | Jones et al. |
| 6,177,865 B1 | 1/2001 | Bryant et al. |
| 6,179,390 B1 | 1/2001 | Guzorek et al. |
| 6,201,284 B1 | 3/2001 | Hirata et al. |
| 6,232,722 B1 | 5/2001 | Bryant et al. |
| 6,234,584 B1 | 5/2001 | Stumpe et al. |
| 6,263,733 B1 | 7/2001 | Reimer et al. |
| 6,273,522 B1 | 8/2001 | Feetenby et al. |
| 6,282,480 B1 | 8/2001 | Morse et al. |
| 6,286,911 B1 | 9/2001 | Wright et al. |
| 6,299,102 B2 | 10/2001 | Happ |
| 6,308,134 B1 | 10/2001 | Croyle et al. |
| D450,661 S | 11/2001 | Weisz et al. |
| D451,611 S | 12/2001 | Pontarolo |
| 6,325,466 B1 | 12/2001 | Robertson et al. |
| 6,364,432 B1 | 4/2002 | Mixon |
| 6,367,588 B1 | 4/2002 | Robertson et al. |
| 6,371,572 B1 | 4/2002 | Frank |
| 6,405,592 B1 | 6/2002 | Murari et al. |
| 6,419,055 B1 | 7/2002 | Walsh et al. |
| 6,445,993 B1 | 9/2002 | Eccleston et al. |
| 6,466,821 B1 | 10/2002 | Pianca et al. |
| 6,473,683 B2 | 10/2002 | Nada |
| 6,499,814 B1 | 12/2002 | Mixon |
| D468,273 S | 1/2003 | Reichard |
| D468,704 S | 1/2003 | Reichard |
| D468,705 S | 1/2003 | Reichard |
| 6,516,925 B1 | 2/2003 | Napier et al. |
| 6,520,528 B2 | 2/2003 | Fandrich et al. |
| 6,532,419 B1 | 3/2003 | Begin et al. |
| 6,557,952 B1 | 5/2003 | Robertson et al. |
| D477,553 S | 7/2003 | Brock et al. |
| 6,609,766 B1 | 8/2003 | Chesnut |
| 6,615,125 B2 | 9/2003 | Eccleston et al. |
| 6,619,759 B2 | 9/2003 | Bradsen et al. |
| 6,626,504 B2 | 9/2003 | Harner et al. |
| 6,634,466 B2 | 10/2003 | Brock et al. |
| 6,652,038 B1 | 11/2003 | Frye |
| 6,655,752 B2 | 12/2003 | Robertson et al. |
| 6,666,527 B2 | 12/2003 | Gill et al. |
| 6,668,225 B2 | 12/2003 | Oh et al. |
| 6,685,281 B2 | 2/2004 | MacGregor et al. |
| D488,370 S | 4/2004 | Sivertsen |
| D490,349 S | 5/2004 | Brock et al. |
| 6,752,474 B1 | 6/2004 | Olberding et al. |
| D494,547 S | 8/2004 | Smith et al. |
| 6,802,572 B2 | 10/2004 | Lamke et al. |
| 6,802,725 B2 | 10/2004 | Rowland et al. |
| D498,190 S | 11/2004 | Brock et al. |
| 6,837,551 B2 | 1/2005 | Robinson et al. |
| 6,845,851 B2 | 1/2005 | Donaldson et al. |
| 6,849,910 B2 | 2/2005 | Oberhardt et al. |
| 6,891,468 B2 | 5/2005 | Koenigsberg et al. |
| 6,918,466 B1 | 7/2005 | Decker, Jr. et al. |
| D509,959 S | 9/2005 | Nykoluk |
| 6,966,613 B2 | 11/2005 | Davis |
| D513,171 S | 12/2005 | Richardson |
| 7,021,723 B1 | 4/2006 | Kaufman |
| D522,041 S | 5/2006 | Sewell et al. |
| D523,803 S | 6/2006 | Smith et al. |
| 7,058,499 B2 | 6/2006 | Kissel |
| D527,710 S | 9/2006 | Smith et al. |
| 7,168,531 B2 | 1/2007 | Navarro |
| 7,204,564 B2 | 4/2007 | Brown et al. |
| D542,745 S | 5/2007 | Barnes, Jr. et al. |
| D551,139 S | 9/2007 | Barnes et al. |
| 7,273,260 B2 | 9/2007 | Gray |
| 7,311,364 B2 | 12/2007 | Robertson |
| 7,347,507 B1 | 3/2008 | Stillinger |
| D581,356 S | 11/2008 | Ahlgren |
| D584,695 S | 1/2009 | Hilsbos et al. |
| D593,507 S | 6/2009 | Svoboda et al. |
| D598,395 S | 8/2009 | Hilsbos et al. |
| 7,575,286 B2 | 8/2009 | Robertson |
| D603,808 S | 11/2009 | Svoboda et al. |
| D619,542 S | 7/2010 | Svoboda et al. |
| 8,145,402 B2 | 3/2012 | Craig |
| 8,165,768 B2 | 4/2012 | Leschuk et al. |
| 8,180,546 B2 | 5/2012 | Culbert et al. |
| 8,186,702 B2 | 5/2012 | Mccoy |
| 8,430,458 B2 | 4/2013 | Kaminski et al. |
| 8,442,797 B2 | 5/2013 | Kim et al. |
| 8,651,585 B2 | 2/2014 | Kaminski et al. |
| 8,700,285 B2 | 4/2014 | Barlsen et al. |
| 8,746,812 B2 | 6/2014 | Albright et al. |
| 8,789,896 B2 | 7/2014 | Albright et al. |
| 9,374,562 B2 * | 6/2016 | Trombley ............ B62D 53/045 |
| 10,723,329 B2 * | 7/2020 | Smith ................... B60T 7/20 |
| 11,292,439 B2 * | 4/2022 | Smith ................. B60T 8/1708 |
| 2001/0038239 A1 | 11/2001 | Ehrlich et al. |
| 2002/0003571 A1 | 1/2002 | Schofield et al. |
| 2002/0038974 A1 | 4/2002 | Lamke et al. |
| 2002/0047684 A1 | 4/2002 | Robertson et al. |
| 2002/0082750 A1 | 6/2002 | Lamke et al. |
| 2002/0095251 A1 | 7/2002 | Oh et al. |
| 2002/0123837 A1 | 9/2002 | Eccleston et al. |
| 2002/0180257 A1 | 12/2002 | Gill et al. |
| 2003/0025597 A1 | 2/2003 | Schofield |
| 2003/0038534 A1 | 2/2003 | Barnett |
| 2003/0042792 A1 | 3/2003 | Reinold et al. |
| 2003/0098610 A1 | 5/2003 | Bradsen et al. |
| 2003/0168908 A1 | 9/2003 | Robinson et al. |
| 2004/0026987 A1 | 2/2004 | Davis |
| 2004/0174141 A1 | 9/2004 | Luz et al. |
| 2004/0245849 A1 | 12/2004 | Kissel |
| 2005/0035652 A1 | 2/2005 | Roll et al. |
| 2005/0077780 A1 | 4/2005 | Robertson |
| 2005/0127747 A1 | 6/2005 | Robertson |
| 2006/0076827 A1 | 4/2006 | Albright et al. |

(56) References Cited

U.S. PATENT DOCUMENTS

| | | | |
|---|---|---|---|
| 2006/0176166 A1 | 8/2006 | Smith et al. | |
| 2006/0214506 A1 | 9/2006 | Albright et al. | |
| 2007/0024107 A1 | 2/2007 | Marsden et al. | |
| 2007/0114836 A1 | 5/2007 | Kaminski et al. | |
| 2007/0222283 A1 | 9/2007 | Skinner et al. | |
| 2008/0143179 A1* | 6/2008 | Rutherford | B60T 7/20 303/20 |
| 2008/0309156 A1 | 12/2008 | Kissel | |
| 2010/0152920 A1 | 6/2010 | McCann | |
| 2010/0152989 A1* | 6/2010 | Smith | B60T 7/085 303/20 |
| 2010/0222979 A1 | 9/2010 | Culbert et al. | |
| 2014/0103619 A1 | 4/2014 | Motts et al. | |
| 2014/0218506 A1* | 8/2014 | Trombley | B60D 1/245 348/113 |
| 2016/0023642 A1* | 1/2016 | Smith | B60T 7/085 303/20 |
| 2020/0039354 A1* | 2/2020 | Kulkarni | B60T 17/22 |
| 2022/0166421 A1* | 5/2022 | Kulkarni | H03K 17/0822 |

FOREIGN PATENT DOCUMENTS

| | | |
|---|---|---|
| SA | 2201986 | 10/1997 |
| SA | 2324091 | 4/2001 |
| SA | 109867 | 8/2006 |
| WO | WO97/07003 | 2/1997 |

OTHER PUBLICATIONS

Service Manual 440-1002 for Carlisle Electric Brake Actuator Kit, Carlisle Industrial Brake and Friction, pp. 1-8.
Electronic Brake Control for 2, 4, 6 and 8 brake applications manual, 2007, Cequent Electrical Products, 9 pgs.
Hayes Lemmerz—Energize III—Brake Controller, http://aftermarket.hayes-lemmerz.com/html/energize_iii.html.
Hayes Lemmerz—Endeavor—Brake Controller, http://aftermarket.hayes-lemmerz.com/html/endeavor.html.
Hayes Lemmerz—Energize XPC—Brake Controller, http://.aftermarket.hayes-lemmerz.com/html/energize_xpc.html.
Dexter Axle—Predator DX2 Controller (058-008-00)—Brake Controller, http://www.dexteraxle.com/inc/pdetail?v=1&pid=1759.
Tekonsha—AccuPower AccuTrac Inertia Brake Control, 1 to 2 Axle Brake System, Model #80510, http://www.tekonsha.com/accuarac.html.
Tekonsha—AccuPower AccuPower DigiTrac II Inertia Brake Control, 1 to 4 Axle Brake Systems, Model #80750, http://www.tekonsha.com/digitrac.html.
Tekonsha—Voyager, Proporational Brake Control, 1 to 4 Axle Brake Systems, Model #9030, http://www.tekonsha.com/tevoyagerintro.html.
Sample of Applicant's products, http://www.hiddenhitch.com/Products/DisplayAccessory.asp?AccessoryID=39503; and 39510.
Sample of Applicant's products, http://www.hiddenhitch.com/Products/DisplayAccessory.asp?AccessoryID=39517; and 39514.
International Searching Authority, European Patent Office, International Search Report for International App. No. PCT/US17/52028 dated Jan. 25, 2018.

* cited by examiner

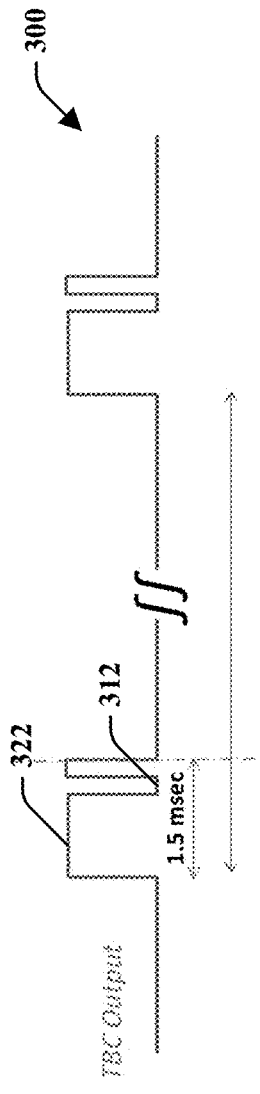
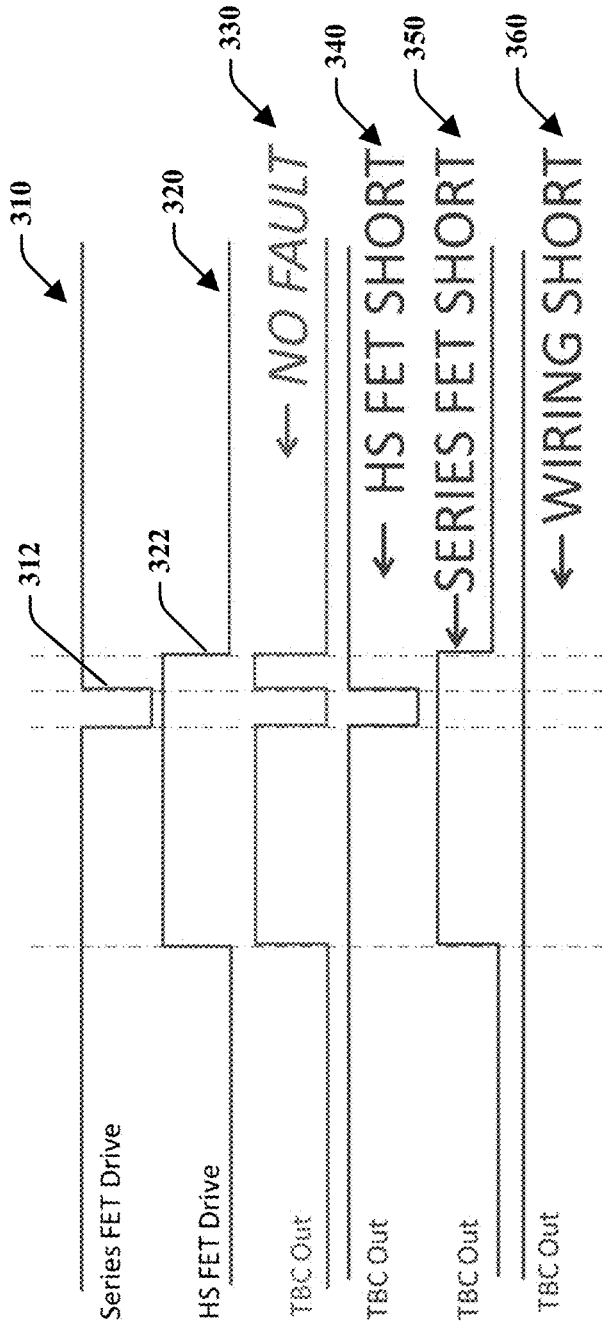
FIG. 3A
FIG. 3B

DRIVER AND DIAGNOSTIC SYSTEM FOR A BRAKE CONTROLLER

CROSS-REFERENCE TO RELATED APPLICATION

This application is a continuation of U.S. application Ser. No. 15/707,267, filed on Sep. 18, 2017 and entitled "DRIVER AND DIAGNOSTIC SYSTEM FOR A BRAKE CONTROLLER" which claims the benefit of U.S. Provisional Patent Application Ser. No. 62/395,439, filed on Sep. 16, 2016 and entitled "FET AND DIAGNOSTIC SYSTEM FOR A BRAKE CONTROLLER," and U.S. Provisional Patent Application Ser. No. 62/395,444, filed on Sep. 16, 2016 and entitled "TRAILER BRAKE CONTROLLER WITH ASYMMETRIC BRAKING SIGNALS," the entireties of which are incorporated herein by reference.

FIELD OF THE INVENTION

The present invention relates generally to brake control units, and more specifically, to a system for diagnosing the existence of a short within an electrical system associated with the brake control unit.

BACKGROUND OF THE INVENTION

A variety of prior art brake control units that provide a brake output signal to the brakes of a towed vehicle have been proposed and/or manufactured. One example of such a brake control unit is provided by U.S. Pat. No. 8,746,812 which is incorporated by reference in its entirety.

In the instance when a short or other fault occurs, many systems associated with the towing, towed vehicle, or brake control unit, may cause the unit to disable itself or will shut down or otherwise cause a potentially undesirable situation. And, if an error occurs in the brake control unit or between the communication of the brake control unit and the towing vehicle, most systems do not have a way of notifying the operator independent of the brake control unit or storing the error for a technician's review thereof.

Most current brake control units are not integral with the towing vehicle's instrument panel. They are aftermarket units which may not be able to communicate with and communicate over existing systems within the towing vehicle. For example, these units may not be able to warn an operator of an error through the towing vehicle's current warning systems. Further, they may be unable to operate with the rest of the displays on the towing vehicle's instrument panel.

Vehicle manufacturers continue to develop and market vehicles' rated towing capacities. As these towed loads increase, the need for systems to ensure safe towing operations also increases, particularly in the area of sway control.

Generally speaking, trailers and other towed apparatus are designed to carry heavy cargo, with loads possibly even exceeding the weight of the towing vehicle itself. In such scenarios, even distribution of the weight—which is often born by the rear axle of the towing vehicle via any known number of connections or hitches—is essential to the safe operation of the towing vehicle (e.g., steering, braking, etc.). If the weight is not properly distributed, if the cargo is unevenly distributed within the towed apparatus, and/or if environmental conditions exist (e.g., crosswinds, winding roads, uneven or rough driving surfaces, etc.), unwanted and potentially dangerous sway (i.e., lateral or side-to-side movement of the trailer with respect to the towing vehicle) may result.

Excessive sway between the vehicle and towed apparatus may cause the towing vehicle to lose effective steering or braking, thereby creating a safety hazard for vehicle passengers, towed cargo, and the surrounding environment, including pedestrians, roadside structures, and other vehicles. Unwanted, dangerous sway may be further exacerbated as vehicle speed increases. Such lateral movement of the towed apparatus may transfer sufficient side-to-side and lateral forces to the towing vehicle to cause the driver to lose control of the towing vehicle.

Past methods and apparatus for controlling sway focused on extra-vehicular equipment. These past efforts usually relied upon mechanical structures, such as spring arms, attached to the vehicle with additional brackets and/or friction pads connected to the towed apparatus. Installation of the system must be performed in concert with whatever connection mechanism (e.g., ball hitch, coupler, etc.) that might be used to actually tow the trailer. In operation, these systems effectively provide mechanical-based resistance, via friction and/or tension, to minimize and control sway before the movement becomes unmanageable, although certain arrangements prevent the driver from being able to move in reverse when the sway controller is engaged. As these systems age, they are subject to wear, thereby requiring inspection, maintenance, and the eventual replacement of the sway control unit. An example of such a system is described in U.S. Pat. No. 8,186,702.

Generally, brake control units have been unable to provide sufficient diagnostic capabilities related to the brake control system. Thus, it may be desirable to provide a brake control system and method for improving the diagnostic capability of the system to identify the location of a fault or short within the electrical system of the towing or towed vehicle. Further, it may be desirable to provide the capability to report the instance of a fault or short as well as report on the location of the fault or short within a brake control system.

In further view of these shortcomings, a solution that did not involve extraneous equipment that must be installed separately from the existing vehicle towing apparatus would be welcome. In the same manner, a sway control that is not as prone to wear and failure as the aforementioned mechanical devices is needed. Finally, to the extent past say controllers relying on mechanical actions/friction are not as ubiquitous and familiar to drivers as vehicle braking systems (which drivers are more likely to understand must be periodically inspected and replaced), a sway control that relies upon familiar components that are already known and inherent to towing operations would be useful.

SUMMARY OF THE INVENTION

A disclosed brake control unit includes a processor, a first driver, and a second driver, wherein the processor is coupled to the first driver and the second driver. The first driver comprises a power devices connect in series to the second driver. The processor operatively provides a first signal to the first driver and a second signal to a second driver. The brake control unit includes at least one output that operatively transmits a signal to be sent to a towed vehicle brake in response to a brake control signal sent from the processor. The signal sent from the output represents at least one of a first signal provided by the first driver, a second signal provided by the second driver, or a third signal provided by a combination of the first high side device and the second driver. The processor receives feedback from at least one of the first driver or second high side drive and determines weather a fault exits. The processor determines a location of the fault that may be a short.

Another disclosed brake control unit includes a processor, a power device, and a driver electrically connected to the power device in series. The brake control unit provides an output signal to a brake line, wherein the output signal represents at least one of a first signal provided by the power device, a second signal provided by the driver, and a third signal provided by a combination of the power device and the driver, wherein the first, second, and third signal may be related to an operating condition of an electrical system of the towed vehicle, towing vehicle and brake control unit, wherein the processor receives feedback from at least one of the power device or driver to identify a short or fault and location of the short or fault. The processor operatively transmits at least one test signal to at least one of the power device or the driver. The test signal comprises a first step function representative of a drive signal processed by the power device and a second step function representative of a drive signal processed by the driver. The first step function and the second step function can be cyclically applied at different times, overlapping times, at different magnitudes, or overlapping magnitudes.

Another disclosed brake control unit includes a processor, a first high side driver and a second high side driver, wherein the processor is coupled to the first high side driver through a first connection and the second high side driver through a second connection, and wherein the processor generates a first signal to be applied to the first connection in order to induce braking in at least one first brake of a towed vehicle, and generates a second signal to be applied to the second connection in order to induce braking in at least one second brake of the towed vehicle. The processor determines whether to apply the first signal and the second signal asynchronously. The processor determines to apply the first signal and the second signal asynchronously based on identifying at least one of a brake lock condition, swaying, back-up, or slippage of a vehicle.

These and other features, advantages, and objects of the present invention will be further understood and appreciated by those skilled in the art by reference to the following specification, claims, and appended drawings.

DESCRIPTION OF THE DRAWINGS

Objects and advantages together with the operation of the present teaching may be better understood by reference to the following detailed description taken in connection with the following illustrations, wherein:

FIG. 3A is a graph of an input signal representative of the brake control system of the present embodiment;

FIG. 3B is a graph of a variety of signals representative of the brake control system of the present embodiment.

DETAILED DESCRIPTION

Figure 1:
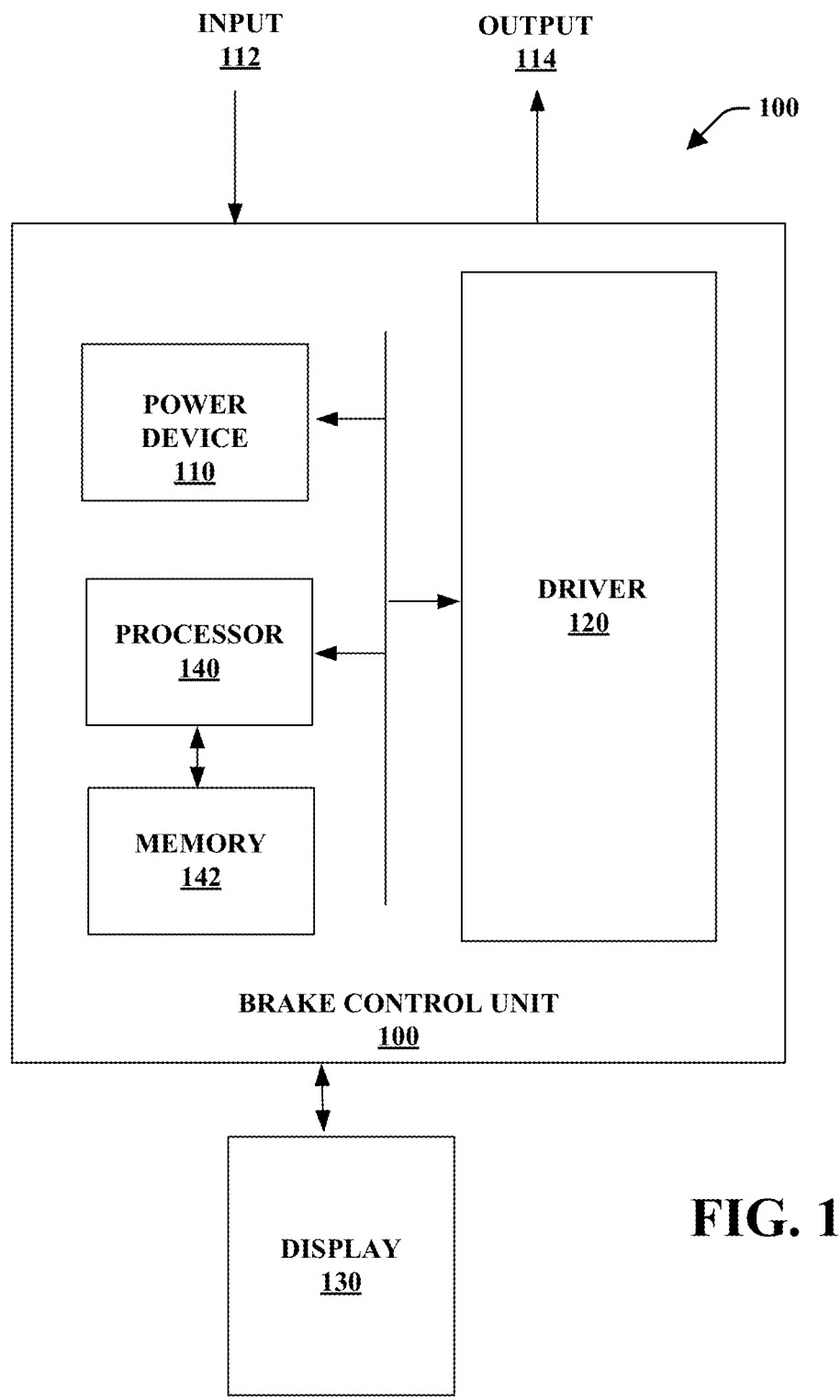
FIG. 1 is a schematic diagram of a brake control system in accordance with the present disclosure.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

The brake control unit and system described herein relies upon asymmetric braking. In operation, this means that the controller will, under selected conditions, provide independent braking signals to each of the brake units it is controlling. In most applications, this means that a trailer having, for example, one axle will receive two separate braking signals—one for the passenger-side wheel and one for the driver-side wheel—on that trailer. Although the separate signals will usually be equivalent, the signals produced by the brake control unit will be different under conditions like sway or a desire by the driver to execute special maneuvers (e.g., small radius turns). The difference in the signals will depend upon the conditions, and the trailer brake control unit may incorporate sensors and/or user inputs that are used to calculate the separate, asymmetric signals.

Disclosed is a brake control system and brake control method. The brake control system may include a brake control unit that generates an output signal to the brakes of a towed vehicle directly related to a variety of input signals sent from the towing vehicle, the towed vehicle, the operator, or a combination of any of the three. An embodiment of the present disclosure is directed to a method for diagnosing the existence of a short or fault within the braking electric system of a towed vehicle. The method comprises providing a brake control unit with a power device and a driver, receiving a first signal through the power device, receiving a second signal through the driver, and processing the first and second signal through a processor to identify if a short or fault exists internally or externally from the brake control unit.

According to yet another embodiment of the present disclosure, a brake control unit comprises a processor, a driver, and a power device. The power device may be electrically connected to the driver in series. The brake control unit provides an output signal to a brake line. The output signal represents at least one of a first signal provided by the power device, a second signal relating to the driver, and a third signal relating to a combination of the power device and the driver. The first, second, and third signal may be related to an operating condition of an electrical system of the towed vehicle, towing vehicle, and brake control unit.

In an aspect, a brake control system for a towed vehicle, e.g., a trailer. The brake control system may include a brake control unit that generates an output signal to the brakes of the towed vehicle to apply a certain brake load thereto. The output signal may be related to a variety of input signals received by the brake control unit from the towing vehicle, the towed vehicle, the operator, or any combination of the three. Additionally, the brake control unit may have the capability of providing diagnostic information related to the existence of a short or fault located within the electrical system of the towed and towing vehicles. Additionally, the brake control system may have the capability of providing diagnostic information related to the location of the short or fault and whether the short or fault is located within the electrical system of the towed and towing vehicles or within the brake control unit. This information can assist an operator or a service technician in diagnosing a location of the fault or short within the system.

The present brake control unit can be an original equipment manufactured (OEM) unit that is installed in the towing vehicle at the factory. Alternatively, the trailer brake control unit can be incorporated into the towing vehicle as an after-market component. The brake control unit can be installed in the dashboard of the towing vehicle, much like a car radio is. In either embodiment, the trailer brake control unit is integrated with the towing vehicle as an electronic control device that provides variable braking power to electric brakes on a vehicle towed by the towing vehicle.

More specifically, the brake control unit generates and applies a particular voltage to the brakes of the towed vehicle so as to apply a brake load to slow-down or stop the towed vehicle. The voltage applied is related to the input signals available on and/or from the towing vehicle, among other available inputs. These additional input signals may come directly from the operator of the towing vehicle, from the towed vehicle, or a combination of any of the three.

The brake control unit may use a variety of preselected or continuously modified algorithms to generate the appropriate output to the towed vehicle brakes based on the received inputs. A processor on the towing vehicle (although it may be located on the towed vehicle or brake control unit) receives the input signals from the source (such as the ABS system, a speed meter, the ignition, the brake pedal, other processors on the towing vehicle, etc.) and generates the appropriate output signal. The algorithms stored within the processor may be updated by having new algorithms entered therein or having the existing algorithms modified automatically or manually. It should be noted that the brake control unit is capable of being reprogrammed meaning that the algorithms stored therein can be modified by a technician or a completely new set of algorithms may be entered therein by a technician. This allows the brake control unit to be updated with new information regarding the towing vehicle, the towed vehicle, or the brake control unit itself. The algorithms stored in the brake control unit correspond to each unique combination of inputs. The selection of the appropriate algorithm or algorithms is done by the processor once it receives the appropriate input information. Further, depending upon changes in the input(s), the processor may select a different algorithm or algorithms to generate the appropriate brake output signal. Of course, the processor or a technician/operator may alter the algorithms stored to generate an appropriate brake output signal.

The brake output signal controlled by the brake control unit based on information it receives can be represented as a transfer function. It should be understood, however, that the transfer function can include any or all of the input signals listed above in any manner or combination. Additionally, it should be understood that the transfer function is not limited to those input signals listed above.

The braking signals produced by the trailer may comprise a pulse width modulation. For example, in U.S. Pat. Nos. 6,068,352 and 8,746,812, which are both currently owned by Horizon Global Americas Inc. and incorporated by reference as if fully rewritten herein, brake control units are described that, at least in part, produce or rely on pulse width modulated braking signals.

As shown in the electrical block diagram of FIG. 1, the brake control unit 100 includes a power device 110 that can receive and send signals to a driver 120. The controller may include a communication bus, such as the high speed controlled area network (HSCAN) bus. For example, the brake control unit 100 can receive and send signals relating to wheel speeds of the towing and/or towed vehicle, vehicle state information from ABS, brake-on-off, etc. The brake control unit 100 can also receive signals from various systems related to the towing vehicle, and can also receive a power signal.

The brake control unit 100 may be in communication with a display 130. It should be understood that any sort of display system can be used. The brake control unit 100 may drive the display 130 thereof to communicate information such as percentage of brake signal output, gain value settings, and trailer connectivity status. Additionally, the display 130 may include an operator notification system to indicate a connected and disconnected state or a short/fault and the particular location that the short/fault that may exist in the electrical system.

The brake control unit 100 can be fully integrated with the towing vehicle. This allows the brake control unit to be originally installed equipment in a towing vehicle. In other words, the brake control unit can be a factory-installed option on a towing vehicle. In such circumstances, the display 130 and the controls for the brake control unit may be integrated into the instrument panel of the towing vehicle. As such, the controls of the brake control unit may operate similarly to the other controls contained in the towing vehicle's instrument panel. Alternatively, the brake control unit 100 may be an after market device capable of being connected to the towing or towed vehicle. Further, the brake control unit 100 may be configured to be inserted into the towing or towed vehicle as an after market component that is inserted into a designated space to make it appear as if it were integrated at time of assembly of the towing or towed vehicle, as applicable.

Accordingly, the brake control unit 100 and display 130 may incorporate a mechanism via software and hardware interface to adjust the various features and functionality of the brake control system. The brake control unit may be controlled through communication with the display and other elements, such as by wireless or serial communication. Further, to operate the components above, the brake control unit 100 may include a processor 140. As used herein, the term "processor" may include a general-purpose processor, a microcontroller (e.g., an execution unit with memory, etc., integrated within an integrated circuit), a digital signal processor (DSP), a programmable logic device (PLD), or an application specific integrated circuit (ASIC), among other processing devices. The processor must have enough on-board memory to contain the software requirements to communicate with the towing vehicle's communication bus (such as the CAN or a high-speed controlled area network (HSCAN)), or other communication systems (such as a local interconnect network (LIN) and a J1850), in-vehicle diagnostics, and required functionality for interpreting vehicle and driver inputs. It may have the capabilities to provide proper control to the: brakes of the towed vehicle, towing vehicle stop lamps during a manual braking event, towed vehicle stop lamps during a manual braking event, and display information accessible to the operator.

As illustrated by FIG. 1, the processor 140 may be operably coupled to a power device 110 and driver 120. The driver 120 may be operable to generate an output signal 114 based on a variety of information received from the towing vehicle (as well as other information from the operator and the towed vehicle). This towing vehicle information can be received through hard-wired inputs from a brake pressure transducer, a brake on-off switch, and an ignition run line. Additional vehicle provided information can be received through the towing vehicle's communication bus. The brake control unit also sends out information on the brake control unit system status via the towing vehicle's communication bus. These messages may be displayed on the display 130. In an aspect, the processor 140 may generate signals that may be sent to various circuits within the brake control unit 100. For instance, the brake control unit 100 may generate asymmetric signals to be sent to different driving circuits (e.g., such as high side drivers operatively connected to vehicle brakes), and drivers that are interconnected to test connectivity and diagnose potential causes for irregularities.

Figure 2:
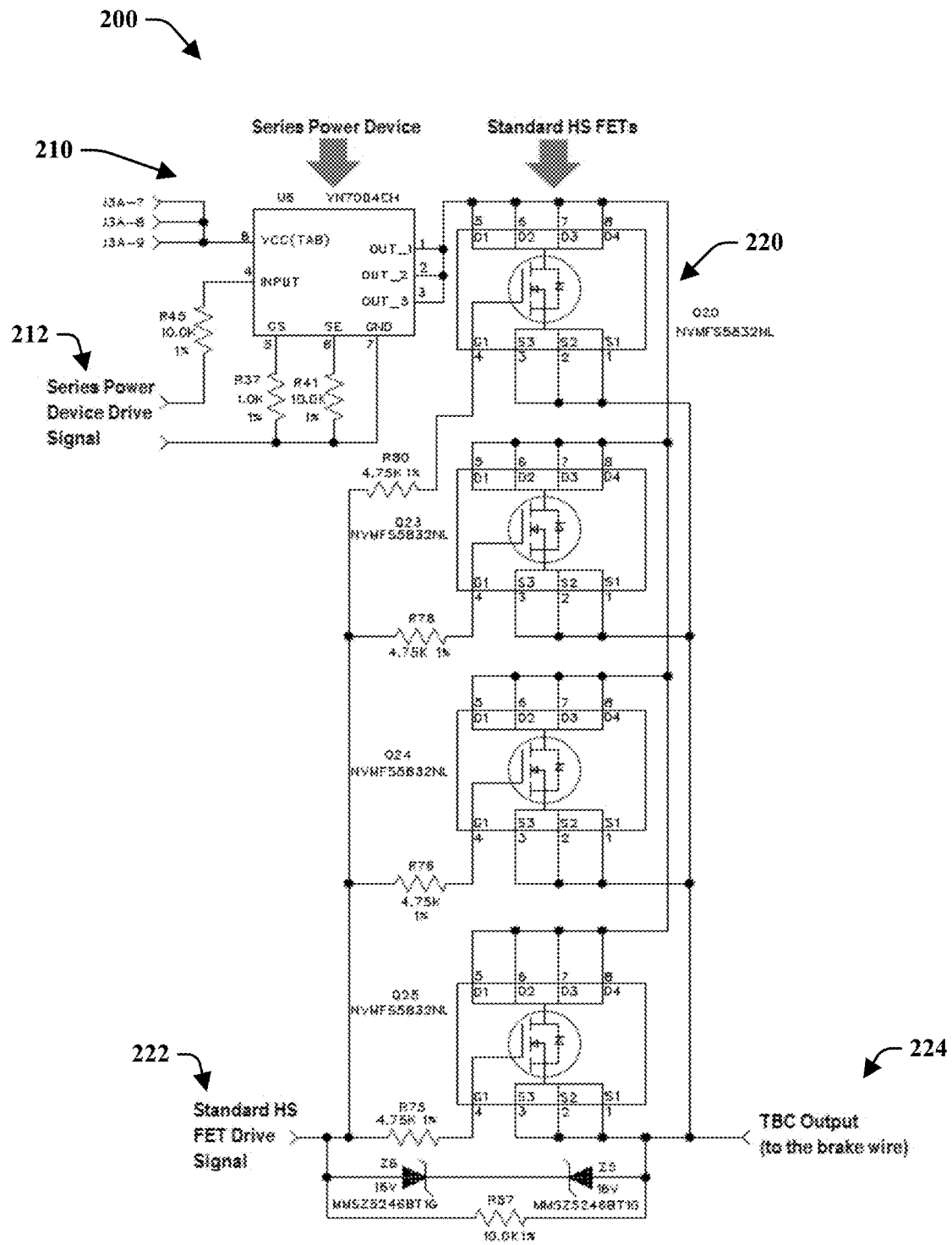
FIG. 2 is an electrical block diagram of the brake control system according to an embodiment of the present disclosure.

As illustrated by the circuit diagram of FIG. 2, the brake control system may include one or more diagnostic circuit(s) 200 configured to identify if a fault or a short exists in the electrical system of the brake control unit. In an example, the brake control unit 100 may include a plurality of drivers, as described in more detail herein that may each operatively drive a brake or set of brakes. Each of the drivers may include test circuits. This may allow the brake control unit 100 to identify issues or diagnose causes in one or more brakes, brake lines, driving circuits or the like.

In at least one embodiment, the power device 210 may be configured to receive a first signal such as a drive signal 212. The power device 210 may be in series communication with the driver 220. The power device 210 may be at least one of a field effect transistor (FET), a transistor, a switch, a relay. For instance, the power device 210 may comprise a high side driver that may be packaged with other circuitry, such as current sensing circuitry, or the like. However, this disclosure contemplates that the power device 210 may be any number of electrical devices configured to be connected in series with a driver and process a signal as described.

In this embodiment, the driver 220 may be a high side driver 220 configured with one or more transistors such as a field effect transistor (FET). As illustrated in this circuit diagram of FIG. 2, the driver 220 may be one or more FETs that are electrically connected in parallel, such as four (4) FETs. In one embodiment, the driver 220 may be a high side driver with four (4) FETs in parallel electrical connection. However, this disclosure contemplates that any number and type of relays, switches, transistors or FETs may be utilized with the driver 220.

In operation, the driver 220 may receive a drive signal 222 to be processed as an output signal 224 to be communicated with the brakes of the towed vehicle. Additionally, the power device 210 may receive a drive signal 212 that may be also processed through the driver 220 as the output signal 224. The signal 212 may be toggled by the power device 210 to generate the output signal 224 that may be processed to determine the existence of a short or fault exists within the electrical system in communication between the towing vehicle, towed vehicle and brake control unit. The signal may also be toggled by the power device 210 to generate an output signal 224 that may be processed to determine the location of the short or fault as it exists within the electrical system of the towing vehicle, towed vehicle, and brake control unit.

FIGS. 3A and 3B illustrate exemplary wave forms of diagnostic test pulse signals processed by the circuit of FIG. 2. FIG. 3A illustrates a diagnostic pulse signal 300 representative of the output signal 224 of the brake control unit 100 that includes the drive signal 212 provided by the power device 210 and the drive signal 222 provided by the driver 220. The test pulse 300 includes a first step function 312 representative of the drive signal 212 processed by the power device 210 and a second step function 322 representative of the drive signal 222 processed by the driver 220. In one embodiment, the second step function occurs for approximately 1.5 msec while the combination of the first and second step functions 312 and 322 may occur cyclically at four (4) second intervals along the test pulse 300. These functions may be programmed to cyclically occur at different times and magnitudes and this disclosure is not limited to the cyclical times or voltage magnitudes of the first and second step functions.

In one embodiment, the first step function 312 illustrates that the diagnostic pulse signal 300 includes a brief interruption of source voltage of the output signal 224. This brief interruption may be caused by the power device 210. The second step function 322 illustrates the source voltage processed by the driver 220. Notably, first diagnostic pulse 310 illustrates the first step function 312 without source voltage provided by the driver 220. Further, test pulse 320 illustrates the second step function 322 without the source voltage interruption provided by the power device 210.

In operation, the brake control system 100 may include circuitry 200 to process signals that may be evaluated to indicate the existence and location of a short or fault within the electrical system. More particularly, diagnostic pulse 330 represents an output signal for the brake control unit that indicates that there exists no fault or short within the electrical system. Diagnostic pulse 330 includes the first and second step functions 312 and 322 as they may be generated by the power device and driver, respectively. This diagnostic pulse 330 illustrates the voltage source of the brake control unit 100 with a normal test pulse.

Diagnostic pulse 340 represents an output signal for the brake control unit that indicates that there exists a fault or short with the internal circuitry of the brake control unit 100 within the electrical system. Diagnostic pulse 340 includes the first step function 312 and does not include a representative signal of the second step function 322 as it may be generated by the driver. This diagnostic pulse 340 illustrates the voltage source of the brake control unit 100 with a short located at the driver 220.

Diagnostic pulse 350 represents an output signal for the brake control unit that indicates that there exists a fault or short with the internal circuitry of the brake control unit 100 within the electrical system. Diagnostic pulse 350 includes the second step function 322 and does not include a representative signal of the first step function 312 as it may be generated by the power device 210. This diagnostic pulse 350 illustrates the voltage source of the brake control unit 100 with a short located at the power device 210.

Diagnostic pulse 360 represents an output signal for the brake control unit that indicates that there exists a fault or short within the electrical system that is external from the brake control unit circuitry 200. Diagnostic pulse 360 does not include a representative signal of the first or the second step function 312 and 322 as they may be generated by the power device 210 and driver 220, respectively. This diagnostic pulse 360 illustrates the voltage source of the brake control unit 100 with a short located within the electrical system of the towed or towing vehicles and not within the brake control unit 100.

By obtaining the appropriate diagnostic test signal, the brake control unit 100 may process the appropriate signal to the display to indicate at the display the status of the electrical system. The status may indicate NO FAULT, HS FET SHORT, SERIES FET SHORT, or WIRING SHORT as appropriate to diagnose a potential voltage shortage within the system. However, any such display indication may be utilized and this disclosure is not limited.

Another performance feature is that the brake control unit circuits may be continuously monitored and diagnosed in the event a short or fault does occur. The short circuit sensing may be continuous and the output voltage may be monitored.

Other optional configurations may include using two or more FETs in parallel, one or more power MOSFETs in parallel, or one or more power transistors in parallel. The driver 220 may deliver a PWM (Pulse Width Modulated) drive to the brake lines.

In another aspect, disclosed brake control units may utilize multiple signals sent from a processor to power MOSFETs to control different brakes or sets of brakes of a towed vehicle. In an aspect, test signals may be disabled during such applications.

For instance, a brake control unit and system described herein relies upon asymmetric braking. In operation, this means that the controller will, under selected conditions, provide independent braking signals to each of the brake units it is controlling. In most applications, this means that a trailer having, for example, one axle will receive two separate braking signals—one for the passenger-side wheel and one for the driver-side wheel—on that trailer. Although the separate signals will usually be equivalent, the signals produced by the brake control unit will be different under conditions like sway or a desire by the driver to execute special maneuvers (e.g., small radius turns). The difference in the signals will depend upon the conditions, and the trailer brake control unit may incorporate sensors and/or user inputs that are used to calculate the separate, asymmetric signals.

Figure 4:
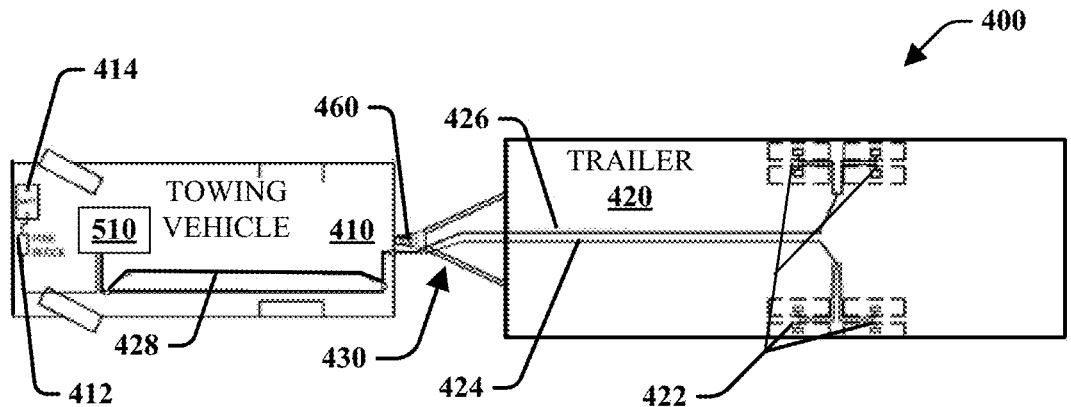
FIG. 4 is a schematic illustration of the independent braking circuits according to certain embodiments of the invention.

FIG. 4 illustrates the configuration of one embodiment of the present system 400. Tow vehicle 410 is coupled to trailer 420 via a connection device 430. Connection device 430 may be any number of hitch connections and, more particularly, those that require or are compatible with the use of a sway controller. Such hitch connection might include a hitch, a hitch bar, and a coupler.

Vehicle 410 may be an automobile, general purpose pick-up truck, or any other common, general purpose motor vehicle. The system 400 is expected to have particular utility as an after-market product that may be selectively installed on vehicle 410 by the end user.

Trailer 420 may, likewise, comprise a general purpose trailer with any number of axles. Such trailers are often used for hauling animals, other vehicles, regular consumer-based cargo, and/or special purpose consumer-oriented items that are produced for a wide base of consumers (and in contrast to commercial trailers and applications). These trailers may have any number of axles, although FIG. 4 illustrates an embodiment with two axles having four wheels on each axle and individual brake units 422 associate with each wheel. At least one, and possibly as many as all, of the axles will be equipped with brake units 422.

Brake units 422 are controlled by a trailer brake control unit 510 via independent braking wire connections located on the driver's side and passenger's side, respectively 424 and 426. Connections 424 and 426 may be integrated into the vehicle 410, trailer 420, and/or connection device 430 by way of dedicated wires, fiber optic cables, and other similar means which may be routed through harness connections 428. Although separate, dedicated signals are contemplated for at least the driver's and passenger's side wheels (or, in some embodiments, a plurality signals corresponding to a plurality of wheels on each side of the trailer), it is possible for all dedicated wire connections 424 and 426, etc. to encompass within a single connection bus.

Trailer brake control unit 510 is provided with a power source (not indicated in FIG. 4) to allow for operation of the controller, including generation of appropriate electrical braking signals, as is known in the art and as will be described herein. Controller 510 may also be connected to the fuse block 412 of vehicle 410.

A rotational sensor is included, preferably in or on the connection device 430. This sensor will indicate when sway conditions are sensed and prompt the trailer brake control unit 510 accordingly, and it may be positioned on or integrated with the hitch ball, as one example. Additionally or alternatively, the sensor may operate by monitoring the relative positioning of distinct points on any two or three way combinations of the vehicle, the connection device, and the trailer (e.g., by comparing the distance between the vehicle and the front end of the trailer at points on both the driver's and passenger's side, oscillations or continuous/irregular changes in those distances relative to one another may indicate sway). Further, such a sensor may measure the yaw between the towed and towing vehicle. The sensor may be of any appropriate configuration, including, without limitation, a camera, yaw sensor, hitch ball angle sensor, or the like. The present teachings are not limited to the type and configuration of sensor utilized.

Such a sensor may incorporate accelerometers, motion detection, global positioning systems, laser or infrared range finders (i.e., monitoring changes in distance between two fixed points over time), load sensing (i.e., tongue weight shifts to an extreme, peripheral point on the hitch ball as a result of swaying or shifting load), and rotational sensing (e.g., via hall Effect sensors and the like) as indicators of sway or the beginning/intensification of sway conditions. The use of micro electromechanical systems (MEMS) and similar electronics can enable the use of an array of sensors and/or the positioning of the sensors at a discrete location. Also, such sensors are likely to have processing and logic capabilities to help analyze and interpret the data.

The sensor itself may be connected, via appropriate wiring or communications systems, to the brake units 422, the connector 560 (described below), and/or any of the components comprising the trailer brake control unit 510 as described in FIGS. 2 and 3 below. The sensor may also require a power supply, which can come from the vehicle, the braking system, or by way of a discrete supply (e.g., a battery).

Figure 5:
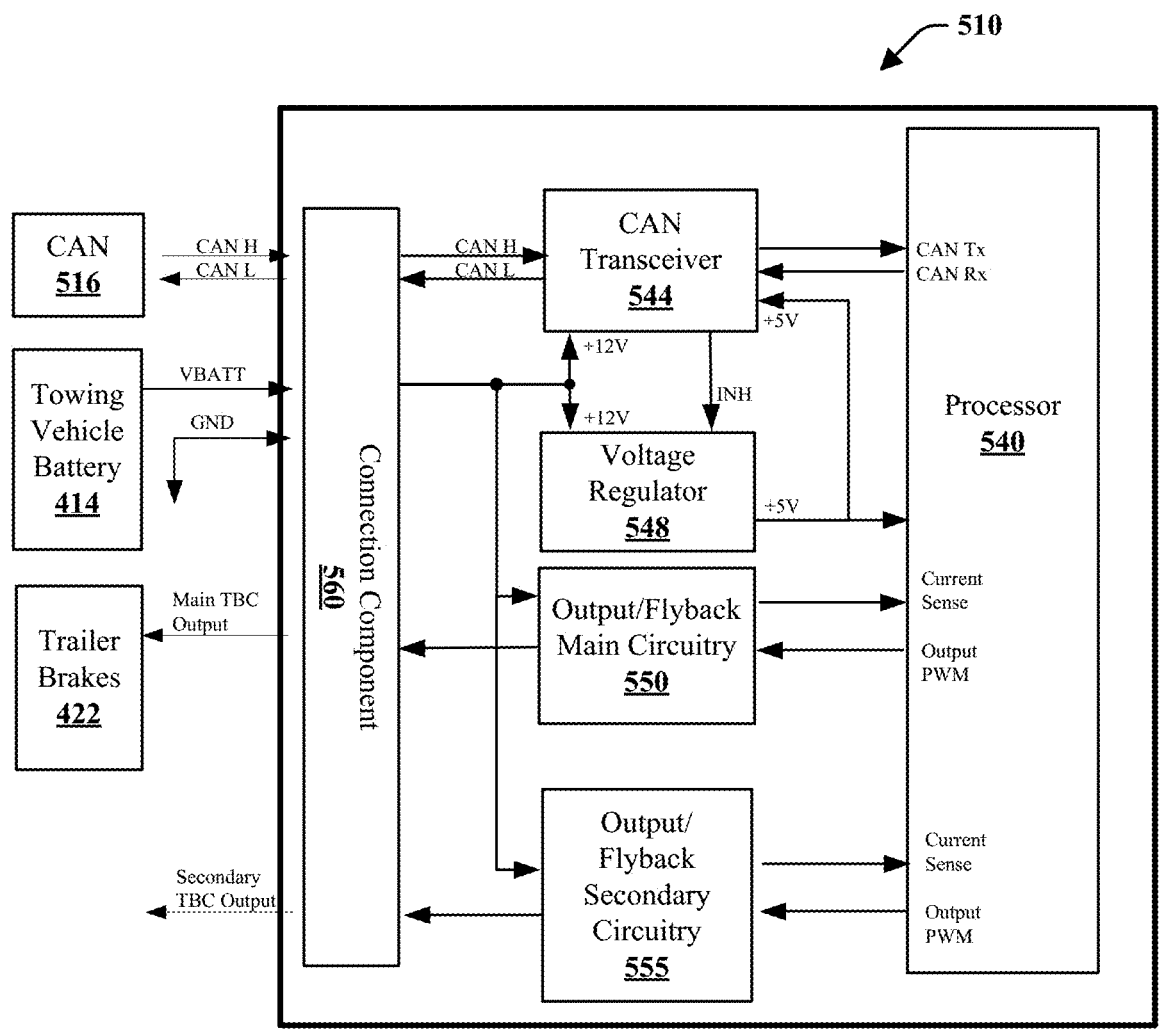
FIG. 5 is a block diagram of certain embodiments of the invention illustrating independently controlled, primary and secondary brake circuits.

As seen in FIG. 5, trailer brake control unit 510 includes a microprocessor 540. Microprocessor 540 allows for programmable logic. In this context, "logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

Also, the term "microprocessor" may include a general-purpose processor, a microcontroller (e.g., an execution unit with memory, etc., integrated within an integrated circuit), a digital signal processor (DSP), a programmable logic device (PLD), or an application specific integrated circuit (ASIC), among other processing devices. The processor must have enough on-board memory to contain the software requirements to communicate with the towing vehicle's communication bus, in-vehicle diagnostics, and required functionality for interpreting vehicle and driver inputs.

The trailer brake control unit 510 provides proper control to the: brakes of the towed vehicle, towing vehicle stop lamps during a manual braking event, towed vehicle stop lamps during a manual braking event, and display information accessible to the operator. To facilitate these operations, the brake control unit 510 may also have a user interface, optionally including a display, keyboard/input device, dedicated input buttons, output indicators/LEDs, and the like.

The brake control unit 510 generates and applies a particular voltage to the brake units 422 in the trailer 420 so as to apply a brake load to slow-down or stop the trailer 420 and the vehicle 410 at compatible rates. The voltage applied is related to the input signals available on and/or from the towing vehicle 410, among other available inputs. These additional input signals may come from or be characteristic of the operator of the towing vehicle 410, from the vehicle 410 itself, from the trailer 420, or a combination of any of the three.

The brake control unit 510 may use a variety of preselected or continuously modified algorithms to generate the appropriate output to the towed vehicle brakes based on the received inputs. A processor on the towing vehicle (although it may be located on the towed vehicle) receives the input signals from the source (such as the ABS system, a speed meter, the ignition, the brake pedal, other processors on the towing vehicle, etc.) and generates the appropriate output signal. The algorithms stored within the processor may be updated by having new algorithms entered therein or having the existing algorithms modified automatically or manually. It should be noted that the brake control unit 510 is capable of being reprogrammed meaning that the algorithms stored therein can be modified by a technician or a completely new set of algorithms may be entered therein by a technician. This allows the brake control unit 510 to be updated with new information regarding the towing vehicle, the towed vehicle, or the brake control unit 510 itself. The algorithms stored in the brake control unit 510 correspond to each unique combination of inputs. The selection of the appropriate algorithm or algorithms is done by the processor once it receives the appropriate input information. Further, depending upon changes in the input(s), the processor may select a different algorithm or algorithms to generate the appropriate brake output signal. Of course, the processor or a technician/operator may alter the algorithms stored to generate an appropriate brake output signal.

In order to produce the asymmetric braking signals, the trailer brake control unit 510 will be programmed to produce independent signals in response to sway detection and/or in response to special commands/requests from the user. In these instances, separate algorithms may be applied to produce separate braking signals according to the circuitry described below. Generally speaking, these separate signals will vary in the intensity and/or frequency of how the individual brakes are applied, with relatively greater braking force applied when the appropriate trailer side is approaching or at its maximum yaw/sway. Insofar as sway is a recurring condition, these algorithms may ramp up and decrease breaking force in response to the intensity of the sway detected by the sensors so as to allow for a controlled and smooth elimination of sway (as opposed to immediately attempting to stop the condition, which may cause cascading problems in the operation and control of the vehicle itself).

Returning to FIG. 5, microprocessor 540 is configured to send and receive data from a controller area network (CAN) transceiver 544 that may receive a signal from a vehicle CAN 516. CAN transceiver 544 is also operatively connected to a voltage regulator 548 as illustrated in FIG. 5. A main output or flyback circuit 50 and a secondary output or flyback circuit 555 are also in operative communication with the microprocessor 540, CAN transceiver 544, and voltage regulator 548. In turn, transceiver 544, regulator 548, and main and secondary flyback circuits 550 and 555 are connected to electrical connector 560.

Such flyback circuits 550 and 555 produce braking control signals in concert with the microprocessor 540. Further, because circuits 550 and 555 provide separate signals via the connector 560, the controller unit 510 creates independent outputs that may be provided separately to any combination of the wheels on trailer 420 (provided appropriate wire connections 424 and 426 are established). To the extent a plurality of output signals beyond those shown in FIG. 5 are desired, additional flyback circuits can be included.

Electrical connector 560 interfaces with the vehicle controller area network, the battery 414, and an appropriate grounding source, as well as connections 424 and 426. While illustrated as a single block in the schematic of FIG. 5, it will be understood that the connector 560 itself may be distributed among several, discrete locations and/or pieces of hardware.

Figure 6:
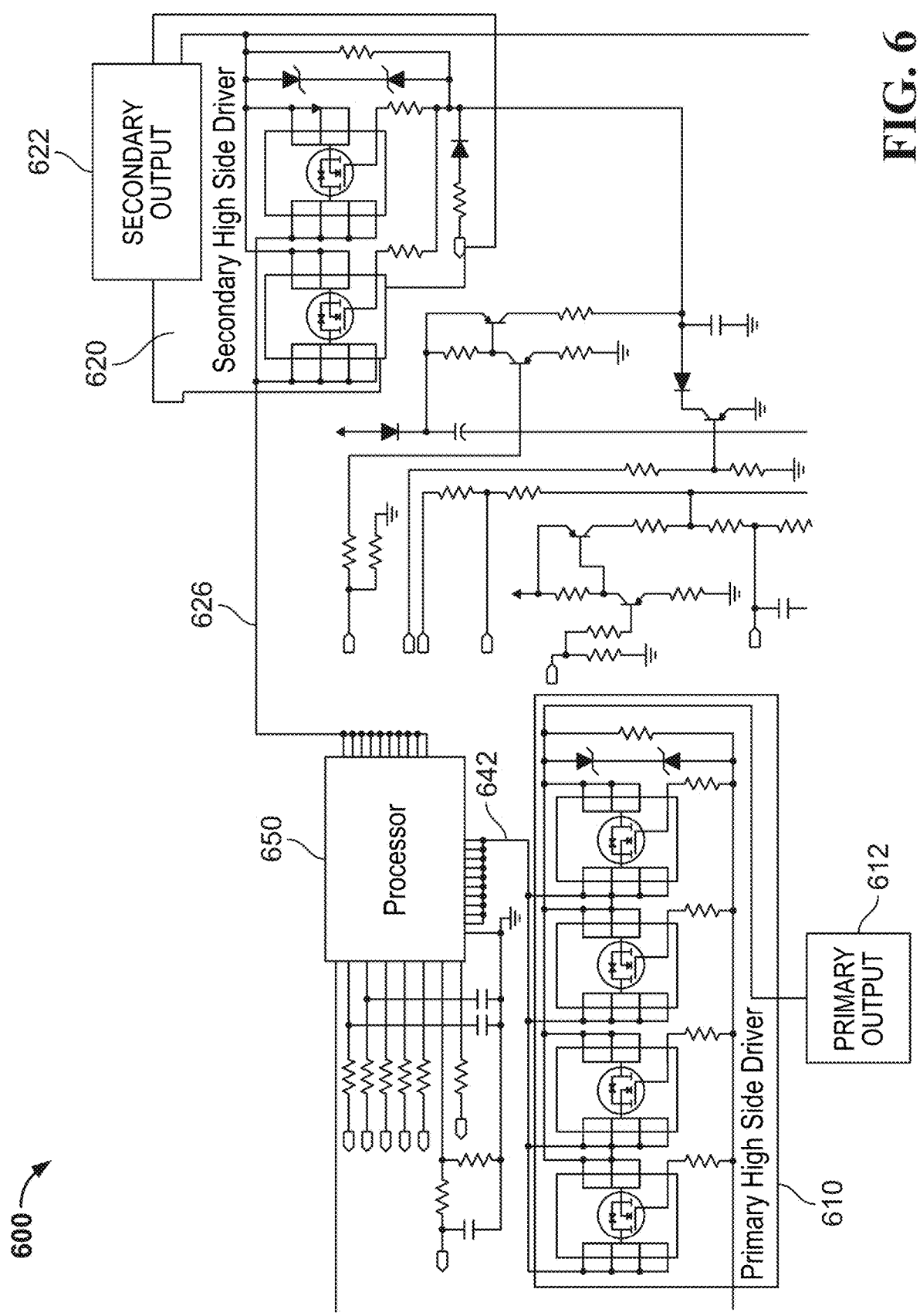
FIG. 6 is an electrical schematic of one embodiment of the primary and secondary field effect transistor (FET) drives. The text included in this figure is incorporated as fully written in the body of this specification.

FIG. 6 illustrates an exemplary schematic diagram of a portion of brake control unit 600 comprising circuitry according to an embodiment of the present system. This figure relies upon standard symbology commonly used in electrical schematic diagrams. In an aspect, the brake control unit generally comprises a processor 650 in communication with a plurality of driver circuits 610 and 622

The brake control unit 600 and the plurality of driver circuits 610 and 622 may be configured to produce independent braking signals, as associated with the flyback circuits described above. For instance, the processor 650 may produce a plurality of brake control signals, such as brake control signal 624 (which may drive the primary high side driver 610 to produce primary output 612) and a brake control signal 636 (which may drive the secondary high side driver 622 to produce primary output 622). Both the primary high side driver 610 and the secondary high side driver 620 include at least one, and more preferably a plurality of, field effect transistors (FET). In operation, these circuits are coupled to the microprocessor to controllably produce the braking signals as contemplated by this disclosure. In regular, non-sway conditions, the signal from only one of the circuits 610 and 622 is provided to effect braking in the trailer 420, although the circuits could also work in parallel with the net effect of producing identical braking signals in regular, non-sway conditions. Additional circuitry may be provided to allow the secondary circuit 622 to be switched on and off, possibly at the discretion of the driver/user, as a safeguard during operation, or for any number of other circumstances in which the possibility of asymmetric signals may not be desirable.

The independent braking also affords the possibility, through appropriate coordination of signals (e.g., via programming/software, appropriate integrated circuits, etc.), to execute special maneuvers with the vehicle and trailer (e.g., sharp turns, etc.). For example, a command could be provided from the trailer brake control unit located in the vehicle that would lock or apply significantly greater braking force to the wheels located on one side of the trailer, effectively anchoring those wheels in position and allowing the opposing side to rotate more freely so as to enable the trailer to execute a turning maneuver with a smaller radius than might otherwise be necessary when all wheels can rotate at the same rate. The command could be executed via a graphical user interface, separate dedicated buttons or switches, or other input means. The controller can be programmed with default safety checks to ensure any such specialized commands are only executed under specified conditions (e.g., the braking sequence could only be initiated when the vehicle is fully stopped).

One advantage of the present system is that it allows users to eliminate separate sway control and trailer brake control devices. The corresponding reduction in equipment simplifies installation, reduces maintenance (insofar as the friction pads and other mechanisms of previous sway controllers are effectively eliminated), and provides for a more seamless user experience.

Figure 7:
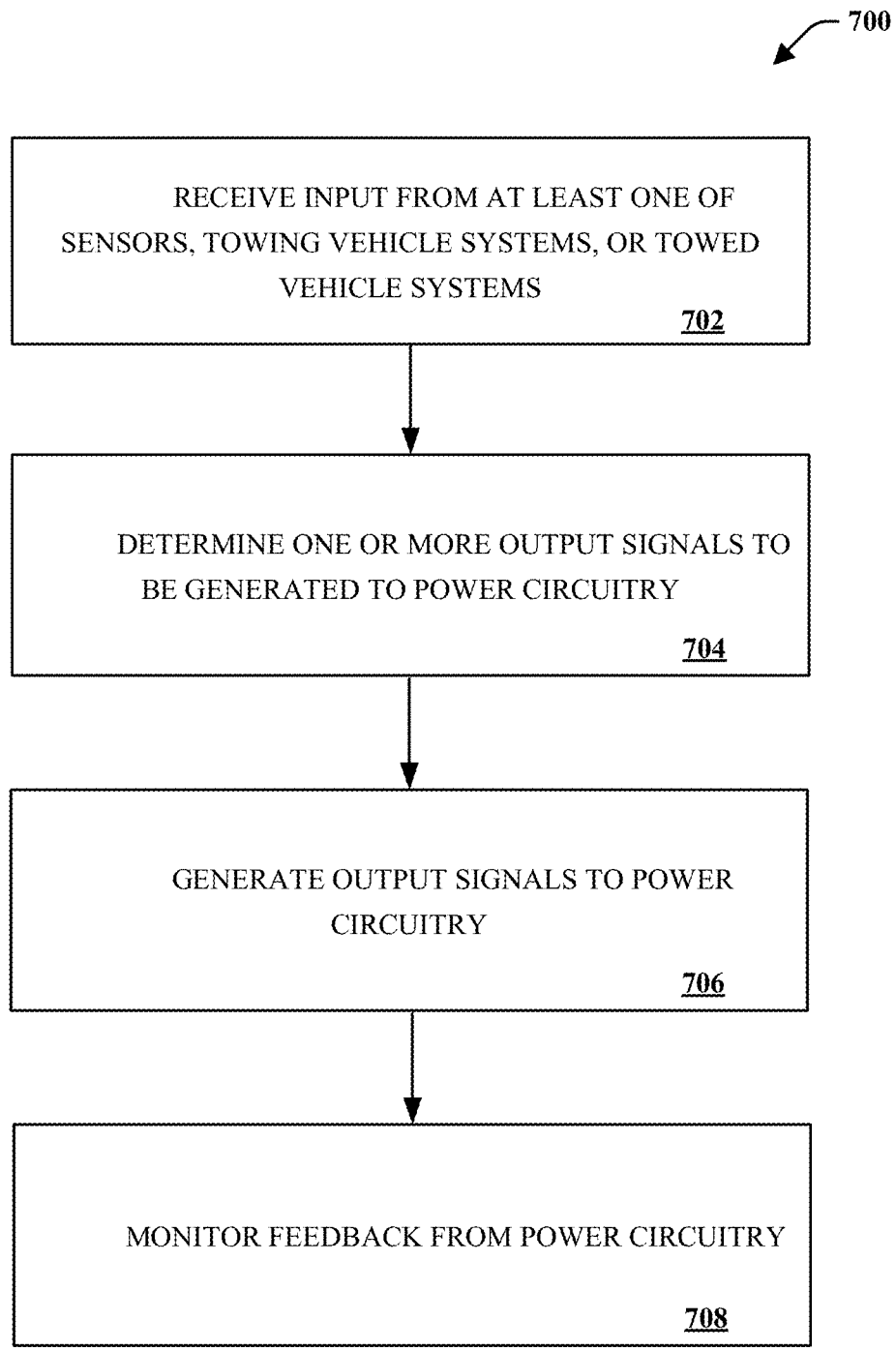
FIG. 7 is an exemplary method for controlling the trailer brakes and diagnostics of a brake control unit.

In view of the subject matter described herein, methods that may be related to various embodiments may be better appreciated with reference to the flowchart of FIG. 7. While the method 700 is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more users, mechanical machines, automated assembly machines (e.g., including one or more processors or computing devices), or the like.

At 702, a system (e.g., brake control unit 100 and 510, etc.) may receive input from at least one of sensors, towing vehicle systems, or towed vehicle systems. For instance, a tow brake control unit may receive input via a network of a vehicle, sensors on a towed or towing vehicle, and/or user input. The input may relate to user actions (e.g., brake application, turn signal activation, gain/sensitivity adjustments), sensed parameters from a towing vehicle (e.g., ABS sensors, wheel speed sensors, light sensors, etc.), or the like.

At 704, the system may determine one or more output signals to be generated to power circuitry. In an aspect, a brake control unit may determine whether it is appropriate to apply a test signal(s), apply asymmetric braking, or apply a standard braking. This determination may be made according to the various aspects described herein.

At 706, the system may generate output signals to power circuitry (e.g., high side drivers, FETS, power devices, etc.). The power circuitry receives the signals as input and generates an appropriate output. For instance, if the signal comprises a test signal, feedback data may be provided to a processor. If the signal is a brake activation signal that is meant to induce braking, the power circuitry applies an appropriate amount of braking as described herein. It is noted that the braking may be asymmetric or not asymmetric as described herein.

At 708, the system may monitor feedback from power circuitry. For instance, a processor may monitor a feedback pin and may process data received therefrom. The processor may diagnose issues based on the feedback as described herein. In another aspect, the processor may control an output device (e.g., display, user interface, etc.) based on the feedback information.

In some embodiments, a brake controller may include all or some of the features of either of the brake controller 100 and brake controller 510 as described above. For the sake of brevity, however, every possible combination is not disclosed herein, but is contemplated hereby.

Modification of the disclosure will occur to those skilled in the art and to those who make or use the invention, including, without limitation, the values provided for the various elements disclosed above. It should be understood that such values are exemplary values and the present invention is not limited to those values. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A brake control unit comprising:
a processor;
a power device; and
a driver electrically connected to the power device in series;
wherein the brake control unit provides an output signal to a brake line,
wherein the output signal represents at least one of a first signal provided by the power device, a second signal provided by the driver, and a third signal provided by a combination of the power device and the driver,
wherein the first, second, and third signal may be related to an operating condition of an electrical system of the towed vehicle, towing vehicle and brake control unit,
wherein the processor receives feedback from at least one of the power device or driver to identify a short or fault and location of the short or fault, the processor operatively transmits at least one test signal to at least one of the power device or the driver, and wherein the test signal comprises a first step function representative of a drive signal processed by the power device and a second step function representative of a drive signal processed by the driver.

2. The brake control unit of claim 1, wherein the first step function and the second step function are cyclically applied at different times and magnitudes.

3. The brake control unit of claim 1, wherein the first step function and the second step function are cyclically applied for at least a partially overlapping times.

4. A brake control unit comprising:
a processor;
a power device; and
a driver electrically connected to the power device;

wherein the brake control unit provides an output signal to a brake line representing at least one of a first signal provided by the power device, a second signal provided by the driver, and a third signal provided by a combination of the power device and the driver, wherein the first, second, and third signal may be related to an operating condition of an electrical system of the towed vehicle, towing vehicle and brake control unit, wherein the processor receives feedback from at least one of the power device or driver to identify a short or fault and location of the short or fault, the processor operatively transmits at least one test signal to at least one of the power device or the driver, and wherein the test signal comprises a first step function representative of a drive signal processed by the power device and a second step function representative of a drive signal processed by the driver.

5. A brake control unit for controlling the brakes of a towed vehicle comprising:

a processor;

a power device; and a driver electrically connected to the power device;

wherein the brake control unit provides an output signal to a brake line of a towed vehicle representing at least one of a first signal provided by the power device, a second signal provided by the driver, and a third signal provided by a combination of the power device and the driver, wherein the first, second, and third signal may be related to an operating condition of an electrical system of the towed vehicle, towing vehicle and brake control unit, wherein the processor operatively transmits at least one test signal to at least one of the power device or the driver, and wherein the test signal comprises a first step function representative of a drive signal processed by the power device and a second step function representative of a drive signal processed by the driver.

* * * * *